(12) United States Patent
Varga (10) Patent No.: US 11,852,218 B2
(45) Date of Patent: Dec. 26, 2023

(54) LINEAR DRIVE

(71) Applicant: DewertOkin KFT, Kecskemét (HU)

(72) Inventor: Zoltán Varga, Kiskunfélegyháza (HU)

(73) Assignee: DewertOkin KFT, Kecskemét (HU)

( * ) Notice: Subject to any disclaimer, the term of this patent is extended or adjusted under 35 U.S.C. 154(b) by 44 days.

(21) Appl. No.: 17/596,535

(22) PCT Filed: Jun. 10, 2020

(86) PCT No.: PCT/EP2020/066118
§ 371 (c)(1),
(2) Date: Dec. 13, 2021

(87) PCT Pub. No.: WO2020/249628
PCT Pub. Date: Dec. 17, 2020

(65) Prior Publication Data
US 2022/0243792 A1 Aug. 4, 2022

(30) Foreign Application Priority Data

Jun. 14, 2019 (DE) ...................... 20 2019 103 358.4
Dec. 17, 2019 (DE) ...................... 10 2019 134 752.1

(51) Int. Cl.
*F16H 25/24* (2006.01)
*H02K 7/06* (2006.01)
(Continued)

(52) U.S. Cl.
CPC ............... *F16H 25/24* (2013.01); *H02K 7/06* (2013.01); *H02K 7/081* (2013.01);
(Continued)

(58) Field of Classification Search
CPC ....... F16H 2025/249; F16H 2025/2481; F16H 2025/209; F16H 2025/2084;
(Continued)

(56) References Cited

U.S. PATENT DOCUMENTS 3,994,179 A * 11/1976 Morrell ................. F16K 31/047
74/89.23
5,809,833 A * 9/1998 Newport ................. F16H 25/20
74/89.41

(Continued)

OTHER PUBLICATIONS

International Preliminary Report on Patentability from corresponding PCT Appln. No. PCT/EP2020/066118, dated Dec. 23, 2021.

*Primary Examiner* — Joseph Brown
(74) *Attorney, Agent, or Firm* — Grossman, Tucker, Perreault & Pfleger, PLLC (57) ABSTRACT

A linear drive comprising an electric motor driving a worm, a worm gear which meshes with the worm and which is connected non-rotatably to a spindle extending along a linear drive longitudinal axis or axis of rotation and which has a rear and a front end. The worm gear has a bearing seat for a rear bearing, with which the worm gear is mounted in a surrounding transmission housing. To simplify the manufacture of such a linear drive the invention proposes that the rear bearing is in the form of a fixed bearing, the spindle comprises a weldable material, a securing disk is arranged on the rear end of the spindle and the securing disk is connected to the spindle in bonded-material relationship.

14 Claims, 4 Drawing Sheets

(51) Int. Cl.
*H02K 7/08* (2006.01)
*F16H 25/20* (2006.01)

(52) U.S. Cl.
CPC ........... *F16H 2025/209* (2013.01); *F16H 2025/2037* (2013.01); *F16H 2025/2084* (2013.01); *F16H 2025/249* (2013.01); *F16H 2025/2481* (2013.01)

(58) Field of Classification Search
CPC . F16H 2025/2037; F16H 25/24; H02K 7/081; H02K 7/06
See application file for complete search history.

(56) References Cited

U.S. PATENT DOCUMENTS

| | | | |
|---|---|---|---|
| 2004/0163881 A1* | 8/2004 | Shiina | F16H 57/12 180/444 |
| 2005/0160846 A1* | 7/2005 | Chiang | H02K 7/06 74/89.35 |
| 2013/0008270 A1* | 1/2013 | Giovannone | B66F 3/18 74/89.37 |
| 2014/0157921 A1* | 6/2014 | Wu | F16H 25/20 74/89.32 |
| 2014/0326089 A1* | 11/2014 | Wu | F16H 25/2021 74/89.23 |
| 2014/0345404 A1* | 11/2014 | Wu | F16H 1/125 74/405 |
| 2015/0285348 A1* | 10/2015 | Ikeda | H02K 7/06 74/89.36 |
| 2015/0326088 A1* | 11/2015 | Funada | H02K 7/116 310/83 |
| 2016/0167700 A1* | 6/2016 | Fujita | B62D 5/0448 180/444 |
| 2017/0222516 A1* | 8/2017 | Sørensen | H02K 7/06 |
| 2017/0331350 A1* | 11/2017 | Sørensen | A61G 7/015 |
| 2017/0350479 A1* | 12/2017 | Shimizu | B23P 19/084 |
| 2019/0257397 A1* | 8/2019 | Wilkins | F16B 7/14 |
| 2020/0008991 A1* | 1/2020 | Wu | F16F 9/103 |
| 2023/0012355 A1* | 1/2023 | Xu | F16H 25/2454 |

* cited by examiner

LINEAR DRIVE

FIELD

The invention concerns a linear drive comprising an electric motor driving a worm, a worm gear which is meshed with the worm and which extends along a transmission longitudinal axis and is non-rotatably connected to a spindle having a rear and a front end. A spindle nut connected to a lift tube runs on the spindle. The lift tube is accommodated longitudinally displaceably in a guide tube and is displaceable by way of the transmission between a retracted retraction position and an extended extension position. Finally, the worm gear has a rear bearing seat with a bearing which is arranged thereon and with which the worm gear is mounted in a surrounding transmission housing.

BACKGROUND

Such a linear drive is preferably used for the automatic adjustment of moveably mounted parts of lying and seating furniture, that is to say furniture items, in particular for automatic adjustment of a head and foot part of a sick bed.

The worm gear thus has a bearing seat on which the bearing sits and is provided with a female thread for non-rotatably accommodating the spindle.

Usually the bearing is in the form of a ball bearing. At the front end the worm gear is mounted in the housing by way of a further bearing which is usually also in the form of a ball bearing.

The non-rotatable fixing of the spindle in the worm gear accommodating same, which usually comprises plastic, is effected either by way of a press fit or by driving pins into grooves or recesses at the rear end of the spindle.

In that way the spindle can carry tensile and compression forces and can transmit them into the surrounding housing by way of the rear bearing.

Such a linear transmission is known from WO 2004/071244 A1. In that linear transmission the worm gear is mounted in the housing by way of a rear ball bearing and a front ball bearing, wherein the rear bearing is in the form of a fixed bearing and the front bearing is in the form of a floating bearing. The outer race of the rear bearing bears against an internal shoulder in the housing so that axial forces of the spindle are passed into the housing by way of the rear bearing.

Disadvantages in the State of the Art

That configuration of the linear drive no longer fully meets present day requirements for efficient manufacture for longitudinal slots have to be milled in the outer trapezoidal thread to provide the non-rotatable connection between the spindle and the worm gear of plastic from the rear end of the spindle, with securing pins being driven into the slots after the worm gear has been screwed on, with the pins engaging into the thread flights of the worm gear. That cutting machining operation is time-intensive and thus cost-intensive.

Object

Taking the above-mentioned state of the art and the disadvantages involved therewith as the basic starting point the object of the invention is to at least partially avoid the disadvantages and in particular to make manufacture of the linear drive easier and less costly.

SUMMARY

Invention

The features of the independent claim attain that object. Preferred features which however are not necessary are recited in the appendant claims.

According to the invention a securing disk is arranged on the rear end of the spindle comprising a weldable material so that in a first embodiment the securing disk bears flat against the rear end. The securing disk is connected in material-bonded relationship at the contact surface to the spindle. In that respect the securing disk represents the sole securing means for the rear bearing on the worm gear and at the same time provides the non-rotatable connection of the spindle and the worm gear.

The securing disk is fitted to the rear end of the spindle and bears against an end contact region at the end of the spindle. Fewer working steps are therefore required for manufacture. It is only necessary for the spindle which is preferably in the form of a steel spindle to be shortened to the appropriate length and connected in material-bonded relationship to the securing disk. If a spindle of suitable length is already provided it is then only necessary to produce the bonded connection.

In an alternative embodiment the central opening within the securing disk is sufficiently large so that the rear end of the spindle can pass with a pass-through insertion portion through the central opening and the securing disk can thus be fitted on to the rear end of the spindle. For that purpose it is possible to provide a seat, also having a step for a securing disk on the spindle, so that it can be pushed thereonto only to the desired degree. Preferably the rear end of the spindle in the installed position projects with about 3-4 mm through the central opening. In this embodiment, by virtue of the pass-through portion, that is to say the rear end of the spindle that projects through the central opening, it is possible to connect that projecting portion to the securing disk in positively locking relationship by means of orbital riveting. In that case that rear projecting portion of the spindle expands over the inner edge of the central opening of the securing disk and thus spans across or projects over the inner edge of the central opening in the form of a mushroom, that is to say flattening radially outwardly, and for that reason this is also referred to using the catchphrase "mushrooming".

Preferably the central opening in the securing disk is round. An alternative embodiment provides that the central opening in the securing disk is profiled or slightly non-round, that is to say it has a central and non-round opening in order to achieve better positively locking entrainment at the peripheral surface of the central opening with the spindle, in particular when the securing disk is pushed on to the spindle and "mushroomed" thereto. In the orbital riveting operation the rear end of the spindle is mushroomed in such a way that a positively locking connection is implemented between the spindle and the internal profile of the securing disk.

To simplify assembly when fitting the securing disk on to the rear end of the spindle it can be advantageous to provide a slight clearance between the central opening and the spindle, in which respect a clearance of about 0.2 mm has been found to be particularly advantageous.

The connection made in that way is so stable that only one bearing is still required for mounting the transmission in the transmission housing, namely the rear bearing which is arranged in relation to the rear fork head. That rear bearing bears with its inner race on the side towards the worm gear directly against a shoulder of the worm gear and is held from its outside by the securing disk.

The outer race of the rear bearing preferably also bears at both sides against the accommodating housing, that is to say it preferably bears at both sides against abutments of the housing, preferably in a bearing seat of suitable configuration in the housing, which can be of a channel-shaped configuration. As only the rear bearing is still required the structure of the linear drive is substantially simpler, easier and quicker to assemble, and in that respect less susceptible to assembly errors and markedly more compact.

Rapid production and durable implementation of the bonded connection between the securing disk and the spindle is preferably achieved by resistance butt welding, which can be particularly well used for automated production.

If the bonded connection is to be made with the use of an additional material the securing disk preferably has a central opening which is arranged in the middle of the securing disk and also makes it possible for a welding torch to be introduced into that central opening in order to fixedly weld the securing disk to the end of the spindle.

The central opening therefore extends continuously from the surface which is the outer surface in the installed position to the surface which is the inner surface in the installed position.

When there is a central opening welding is effected in the resistance butt welding procedure only in the region of the overlap, that is to say the annular end contact surface between the outer radius of the steel spindle and the radius of the central opening, that is to say only in the annular region at which the securing disk bears at the end against the spindle. The connecting region produced by that overlap reduces the shearing stress upon loading in the weld seam upon actuation of the spindle, and that sufficiently compensates for possible faults in the welding procedure. At the same time however the welding time is reduced in relation to the configuration of the securing disk without a central opening because less material has to be heated up.

The central opening preferably extends in the longitudinal direction from the front surface to the rear surface. Accordingly in the installed position there is formed between the outer radius of the spindle and the inner radius of the central opening the overlap region between the end face of the spindle and the face of the securing disk, with which the securing disk in the installed position bears at the end against the rear end of the steel spindle and is connected to the spindle in that region in material-bonded relationship.

For connecting the securing disk to the spindle, upon assembly of the linear drive, that is to say when fitting the worm gear on to the rear end of the spindle, the rear bearing is fitted on to the bearing seat of the worm gear. The spindle is then held or gripped by jaws, that preferably being effected at the front end of the spindle. The securing disk is then fitted on to the rear end of the spindle and a copper mandrel presses the securing disk against the rear end face of the spindle. A current of between 500 and 800 amperes is then applied for 1.5 to 2 seconds so that in the contact region of the overlap the steel becomes liquified with a pasty composition and non-releasably connects the spindle to the securing disk. Unwanted damage to the surrounding plastic parts, in particular the worm gear, is effectively avoided by the combination of the high current and short time. After a brief cooling phase the jaws are opened and the mandrel removed.

An even faster and reliable welding process can be implemented by the use of a ring electrode, the dimension of which substantially corresponds to the overlap and which therefore in the welding operation bears externally against the securing disk in the region of the overlap.

Preferably the overlap is more than 30 percent, even better more than 50 percent or even more than 60 percent of the total end area of the spindle so that even relatively high levels of torque and axial forces can therefore be carried.

To improve the transmission of torque from the worm gear to the spindle positively locking connecting means which act in complementary relationship in the installed position can be provided between the securing disk and the worm gear.

Preferably those positively locking connecting means include at least one complementary pair from the group of projection and recess or opening. Preferably provided at an external peripheral surface of the securing disk is at least one recess, into which a projection of complementary configuration on the worm gear engages.

Particularly uniform torque or force transmission is achieved by the securing disk at the outer peripheral surface having two, preferably diametrally opposite, recesses, into which complementary projections on the worm gear engage.

Preferably the at least one projection extending rearwardly adjoins a bearing seat provided on the worm gear, with a shoulder for the rear bearing.

In the preferred embodiment the worm gear is provided with an inner profile which particularly preferably is in the form of a female thread complementary to the male thread on the spindle. That thread connnection transmits at least the axial displacement forces from the spindle by way of an abutment on that bearing seat to the inner race of the rear bearing and thus to the housing or a fork head in the housing.

Although the proposed linear drive requires only the rear fixed bearing for functional operability the service life and smoothness of operation can nonetheless be improved if the worm gear has a front bearing arranged between the worm gear and the guide tube or the spindle nut. That front bearing can however be in particular in the form of a plain bearing of a small configuration, for example by a bar or a bearing eye which in the form of a floating bearing supports the worm gear at the front in the housing.

The linear drive is preferably used as a furniture drive, particularly preferably for adjustment of a pivotable head or foot part of a sick bed. The man skilled in the art will appreciate that this can be used generally for displacement of mechanical devices of any kind, in particular for displacing a moveable component in relation to a stationary component or in relation to another moveable component.

The linear drive according to the invention is described by way of example hereinafter with reference to the Figures. All features of the linear drive are deemed to be disclosed in this respect independently in themselves and irrespective of other features.

In the context of this description the terms "connected", "joined" and "integrated" are used to describe both a direct and also an indirect connection, a direct or indirect join or direct or indirect integration. Identical or similar components are denoted by identical references in the Figures insofar as that is desirable. The views in the Figures are substantially true to scale. However certain regions can be shown on an enlarged scale as will be apparent to the man skilled in the art to illustrate details. In addition the drawings can be strikingly simplified and do not contain every detail which is possibly present in a practical implementation.

Unless otherwise specified the indefinite article and the definite article refer not just to an individual component but are to be interpreted as "at least one". The terminology includes the above-mentioned words, deviations therefrom and similar meanings. It should further be appreciated that the terms "approximately", "substantially" and similar terms in connection with the dimensions and a property of a component of the invention describe the described dimension and property not as a strict limit or parameter and do not exclude minor deviations therefrom, that are functionally similar. At least parts of description with numerical parameters also include variations in those parameters in accordance with mathematical and manufacturing principles in the state of the art, for example roundings, deviations and other systematic errors, manufacturing tolerances and so forth.

BRIEF DESCRIPTION OF THE DRAWINGS

Finally in relation to a plurality of identical components or elements, for reasons of clarity, only a respective one is denoted by a reference numeral.

In the drawings.

DETAILED DESCRIPTION

Figure 1:
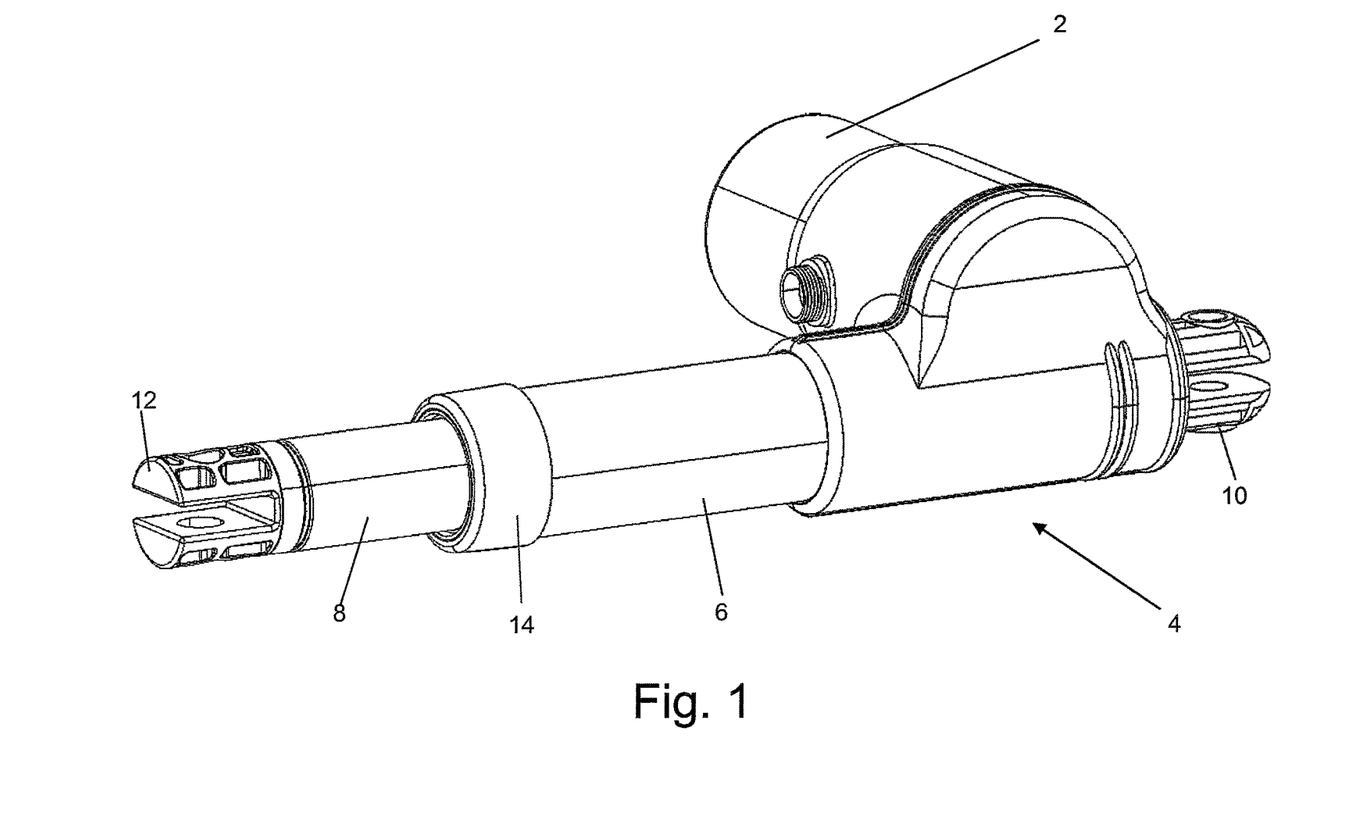
FIG. 1 shows an isometric view of the linear drive from the front.
Figure 2:
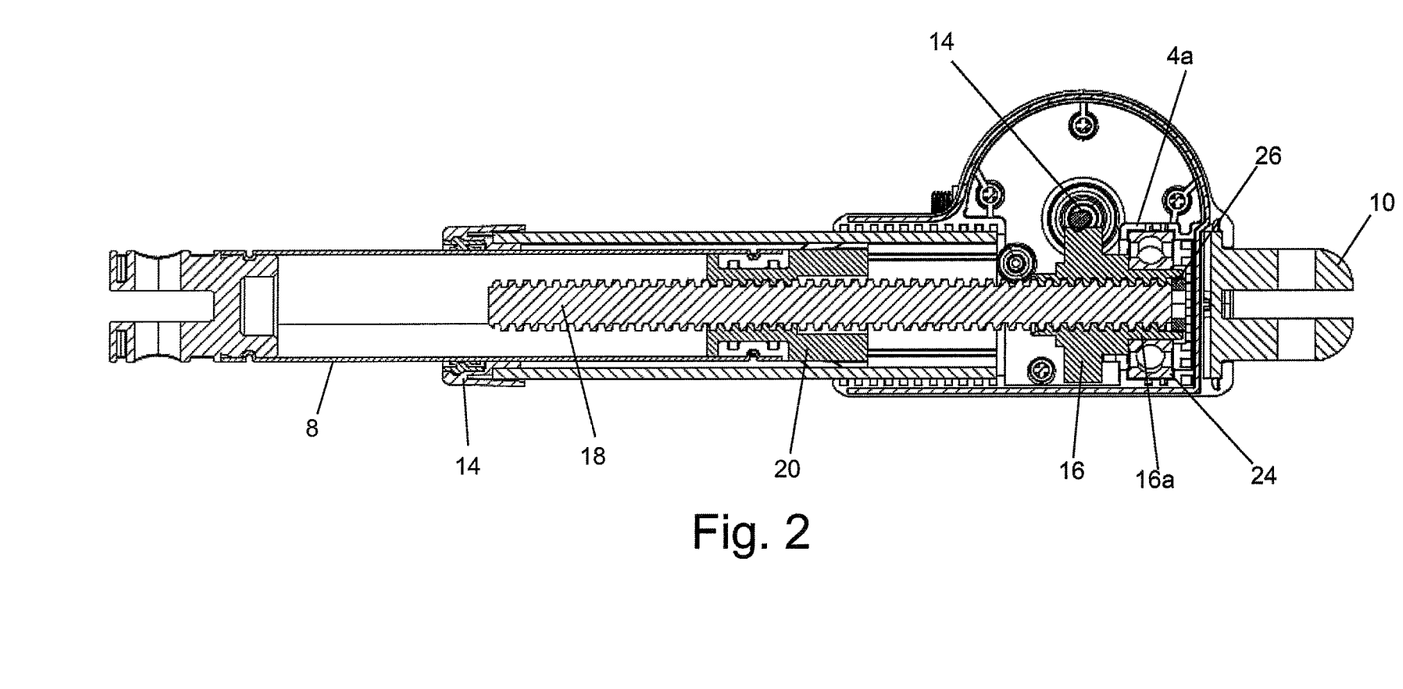
FIG. 2 shows a longitudinal section through the linear drive shown in FIG. 1.

Accordingly the linear drive shown in its entirety in FIGS. 1 and 2 substantially comprises an electric motor accommodated in a motor housing 2 extending transversely relative to a transmission housing 4.

Accommodated in a front end of the transmission housing 4 is a guide tube 6 which in turn relatively moveably accommodates a lift tube 8 which is displaceable along a longitudinal axis of the linear drive by means of a spindle nut displaceable on a spindle. Thus the lift tube can be displaced axially along the longitudinal axis of the linear drive from an end position of being retracted into the guide tube 6 into an end position of being extended out of the guide tube by way of the transmission accommodated in the linear drive.

Carried on the front end of the guide tube 6 is a sealing head portion 14 which prevents the ingress of water between the guide tube 6 and the lift tube 8.

A rear fork head 10 is fitted into or alternatively formed on the rear end of the transmission housing 4. A front fork head 12 is fixed to the front end of the lift tube 8. By way of that fork head 10, 12 the linear drive is held for example between the underside frame of a bed and the pivotable frame part, for example a head or foot part, that is to be displaced, or it is fixed there with struts which can thus be displaced relative to each other by the lift tube 8 being extended out of the guide tube 6 and retracted into same again.

FIG. 1 shows the linear drive with the lift tube 8 partially extended.

Referring to FIG. 2, displacement of the lift tube 8 is effected by way of the electric motor which is accommodated in the motor housing 2 and which drives a shaft with a worm 14 arranged thereon at the end and which in turn meshes in known manner with a worm gear 16. Fitted into that worm gear 16 is a steel spindle 18 on which there runs a spindle nut 20 connected to the lift tube 8.

At a rear end facing away from the lift tube 6 the worm gear 16 has a rear bearing seat 16a on which the inner race of a bearing 24 is carried, the outer race thereof being accommodated in the surrounding transmission housing 4. The outer race of the bearing 24 sits in a bearing receiving means 4a of the transmission housing 4, that forms an abutment at both sides for the outer race of the bearing 24 so that it is therefore fixedly accommodated in the transmission housing 4 and can carry and transmit both radial and therefore also axial forces. That bearing 24 which is in the form of a fixed bearing can thus represent the single bearing for supporting the spindle 26 with the worm gear 16 in the transmission housing 4.

The bearing 24 is fixed by way of a securing disk 26 which is welded in material-bonded relationship to the rear end of the spindle and which preferably also comprises steel and the outside diameter of which in the present case is larger that the outside diameter of the steel spindle 18 and the bearing seat 16a.

Figure 4:
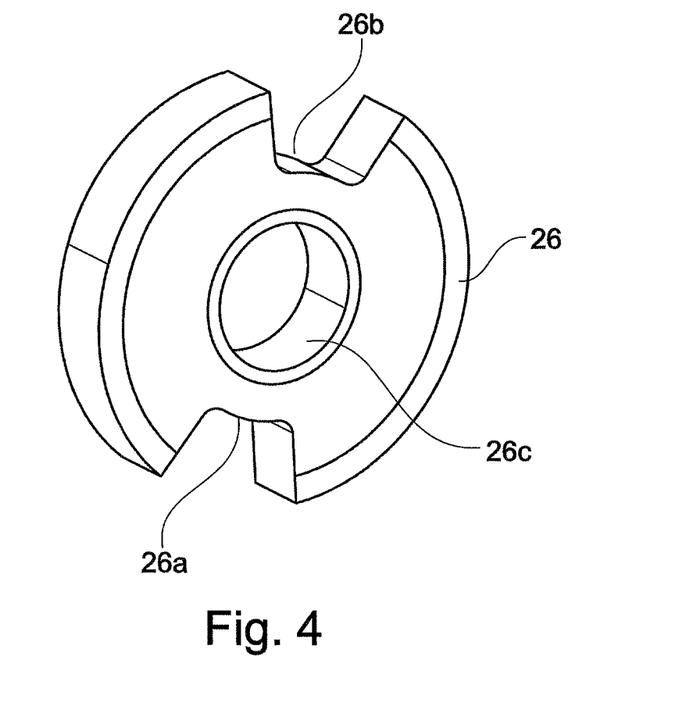
FIG. 4 shows an isometric exploded view of the assembly shown in FIG. 3.

The securing disk 26 which is also shown isometrically in the exploded view in FIG. 4 has in the outer peripheral surface in diametrally opposite relationship two recesses 26a, 26b into which two complementary pin-like projections 16b, 16c at the rear end of the bearing seat 16a engage and thus at the same time provide the non-rotary connection between the spindle 26 and the worm gear 16. The securing disk further has a central opening 26c which extends continuously in the longitudinal direction from the front face to the rear face. Thus the overlap region between the spindle end face and the securing disk end face is formed between the outer radius of the spindle and the inner radius of the central opening 26c; it is with the overlap region that the securing disk 26 bears in the installed position at the end against the rear end of the steel spindle and in that region is connected to the spindle in material-bonded relationship. Accordingly the region between the outer peripheral surface of the steel spindle 18 and the inner peripheral surface of the central opening forms the overlap, that is to say the annular surface at which the steel spindle 18 bears at the end against the inner face of the securing disk 26.

Actuation of the worm 14 by way of the electric motor thus causes rotation of the worm gear 16 and the steel spindle 18 non-rotatably accommodated therein, whereby the spindle nut 20 provided with the complementary female thread is displaced on the spindle 18 within the stationary guide tube 6. It is sometimes possible that that overlap region is at least portion-wise interrupted by the recesses 26a, 26b. That however does not undermine the durability.

Figure 5:
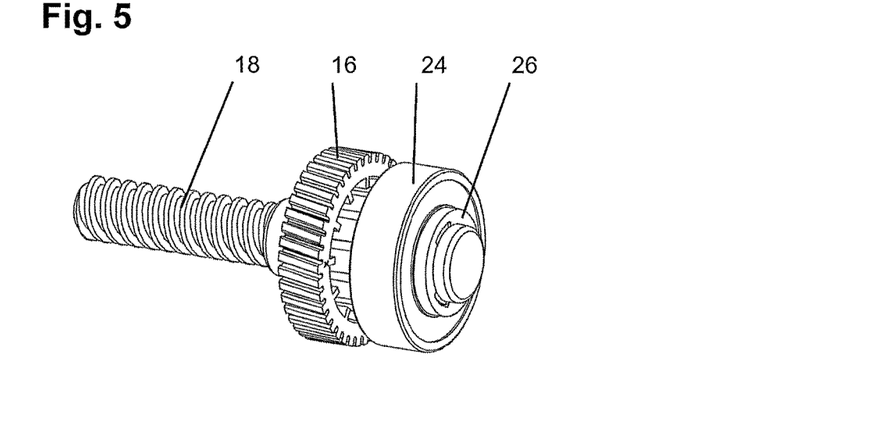
FIG. 5 shows an isometric enlarged view of an alternative embodiment of the assembly including the spindle nut fitted on to the rear end of the spindle, the fitted rear bearing and the securing disk connected to the spindle.

In the embodiment shown in FIG. 5 the securing disk 26 is fitted with its central opening on to an attachment portion of the rear end of the spindle 18. In that case the spindle 18 projects through the central opening and is connected in positively locking relationship to the securing disk 26 by means of orbital riveting. FIG. 5 shows that by the mushroom-like enlargement of the outer diameter of the spindle 18 at its free end directly beside the securing disk 26.

Figure 6:
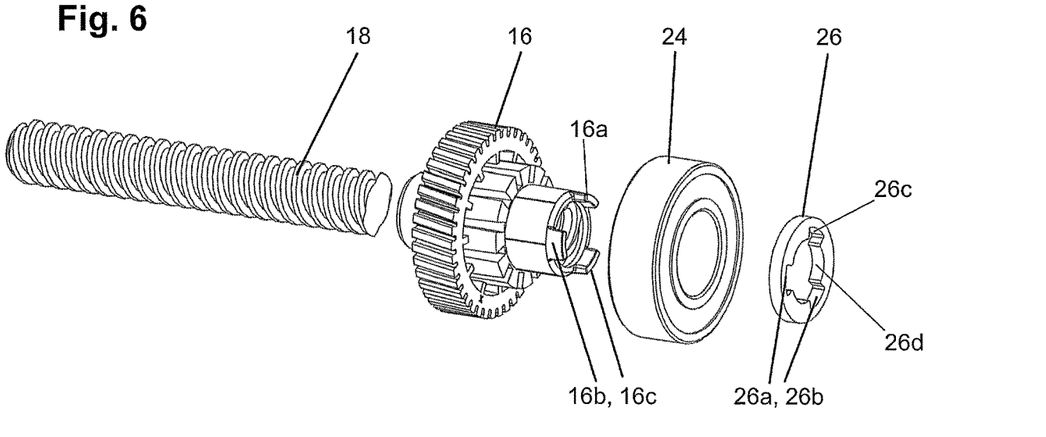
FIG. 6 shows an isometric exploded view of the assembly shown in FIG. 5.

The exploded view in FIG. 6 illustrates the arrangement ready for assembly as shown in FIG. 5.

In this case the spindle 18 is solely sawn off and its end is in a substantially burr-free state. The securing disk 26 can be clearly seen, which in this embodiment is provided with three radially outwardly extending, peripherally mutually spaced recesses 26a, 26b distributed uniformly about the central opening 26c. In this case the central opening 26c is adapted to be fitted directly on to the thread flights of the spindle 18.

In another embodiment which is not shown in detail here the spindle at the rear end has a reduced-diameter step to which the central opening 26c corresponds.

Figure 3:
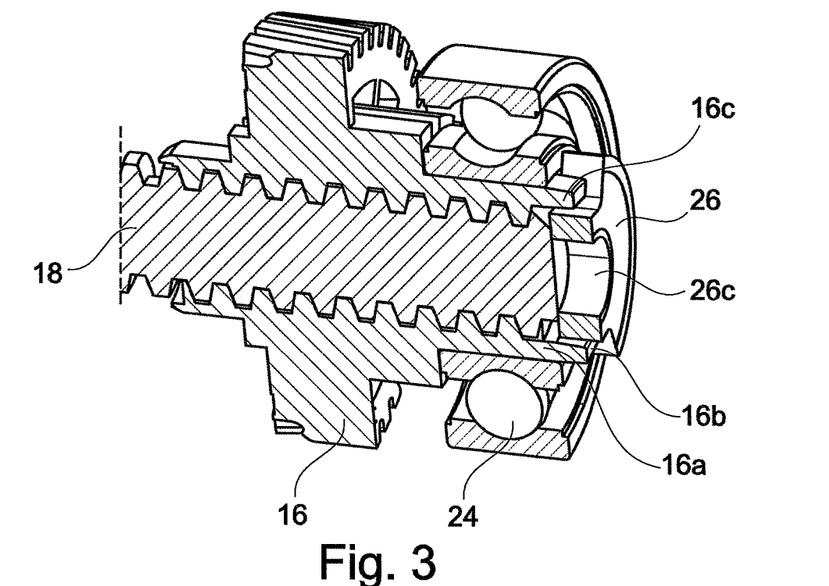
FIG. 3 shows an isometric enlarged view of the assembly including the spindle nut fitted on to the rear end of the spindle, the fitted rear bearing and the securing disk connected to the spindle.

Furthermore FIG. 6 shows three projections 16a, 16b, 16c which are provided extending in the axial direction on the worm gear 16 in the region of the bearing seat 16a in mutually peripherally spaced relationship, in particular being formed in one piece thereon. After assembly those projections 16a, 16b, 16c engage into the recesses 26a, 26b so as to produce a non-rotatable connection between the worm gear 16 and the securing disk 26. It is not possible here to see the female thread of the worm gear 16, as is shown by the views in FIGS. 2 and 3. For fitment of the worm gear 16 on to the spindle 18 it is screwed on to the spindle. After assembly is effected the female thread of the worm gear 16 and the male thread of the spindle 18 form a play-free connection so that axial forces can be transmitted in the longitudinal direction of the spindle 18 to the worm gear 16 and the bearing seat 16a thereof.

Figure 7:
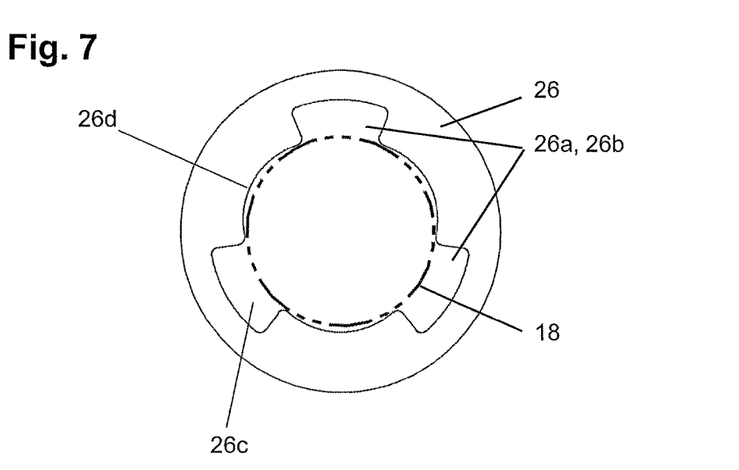
FIG. 7 shows an end view of the securing disk of the embodiment shown in FIGS. 5 and 6.

FIG. 7 shows the securing disk 26 viewing on to the rear face thereof. The three recesses 26a, 26b, 26c are arranged at uniform angular displacements projecting radially outwardly around the central opening. The outer diameter of the spindle 18 is further illustrated by a dash-dotted line and it can be seen that there is a slight clearance between the outside diameter of the spindle and the internal width of the central opening for simplified fitment of the securing disk 26 on the spindle 18. The central opening 26d with a non-round internal cross-section can also be clearly seen. Between the recesses 26a, 26b, 26c the internal contour of the securing disk 26 is admittedly substantially round but those portions involve a smaller radius than the spindle 18. The central opening 26d of the securing disk 26 is thus provided with further profilings and is accordingly of a non-round configuration. During assembly and in particular during the orbital riveting process the outside diameter of the spindle 18 enlarges and fits snugly to the profilings or to the non-round configurations of the central opening 26d in such a way that after assembly there is a positively locking and non-rotatable connection between the spindle 18 by way of the securing disk 26 to the worm gear 16 and at the same time a positively locking connection, which is non-displaceable in the longitudinal direction of the spindle 18, is formed between the securing disk 26 and the spindle 18 so that the inner race of the bearing 24 is fixed at both sides, both by the shoulder of the worm gear 16 on the one hand and also by the securing disk on the other hand, and is to be classified as a fixed bearing relative to the spindle 18.

LIST OF REFERENCES 2 motor housing
4 transmission housing
4a bearing receiving means
6 guide tube
8 lift tube
10, 12 fork head
14 sealing head portion
16 worm gear
16a bearing seat
16b, 16c projection
18 steel spindle
20 spindle nut
24 bearing
26 securing disk
26a, 26b recess
26c central opening

What is claimed is:

1. A linear drive comprising:
an electric motor driving a worm,
a worm gear which meshes with the worm and which is non-rotatably connected to a spindle which extends along a linear drive longitudinal axis or axis of rotation and which has a rear end and a front end,
a spindle nut which is connected to a lift tube and runs on the spindle,
a guide tube which relatively moveably accommodates the lift tube,
wherein the lift tube is displaceable from a retracted position of being retracted into the guide tube into an extension position of being extended from the guide tube,
wherein the worm gear has a bearing seat for a rear bearing with which the worm gear is mounted in a surrounding transmission housing,
wherein the rear bearing is in a form of a fixed bearing, that the spindle comprises a weldable material, that a securing disk is arranged on the rear end of the spindle and that the securing disk is connected to the spindle in material-bonded relationship, and
wherein provided between the securing disk and the worm gear is at least one pairing comprising a projection and a complementary opening or recess, that engage into each other in an installed position.

2. The linear drive according to claim 1, wherein the securing disk has a central opening so that the securing disk in a peripheral edge region bears in surface contact against the rear end of the spindle to form an overlap.

3. The linear drive according to claim 1, wherein the securing disk is connected to the spindle in the material-bonded relationship by a welded connection.

4. The linear drive according to claim 1, wherein the material-bonded relationship comprises an additive material.

5. The linear drive according to claim 1 wherein provided at an outer peripheral surface of the securing disk is at least one recess, into which in the installed position a projection of complementary configuration of the worm gear engages.

6. The linear drive according to claim 5, wherein at the outer peripheral surface the securing disk has two diametrally opposite recesses, into which projections of complementary configuration of the worm gear engage.

7. The linear drive according to claim 1, wherein a front plain bearing is provided between the worm gear and the guide tube.

8. The linear drive according to claim 1, wherein the worm gear includes or consists of plastic.

9. The linear drive according to claim 3, wherein the welded connection is a butt-welded connection.

10. A linear drive comprising:
an electric motor driving a worm,
a worm gear which meshes with the worm and which is non-rotatably connected to a spindle which extends along a linear drive longitudinal axis or axis of rotation and which has a rear end and a front end,
a spindle nut which is connected to a lift tube and runs on the spindle,
a guide tube which relatively moveably accommodates the lift tube,
wherein the lift tube is displaceable from a retracted position of being retracted into the guide tube into an extension position of being extended from the guide tube,
wherein the worm gear has a bearing seat for a rear bearing with which the worm gear is mounted in a surrounding transmission housing, and
wherein the rear bearing is in the form of a fixed bearing, that a securing disk is fitted with a central opening on to a fitment portion of the rear end of the spindle so that a pass-through portion of the rear end of the spindle projects through the central opening and that the pass-through portion is positively lockingly connected to the securing disk by orbital riveting.

11. The linear drive according to claim 10, wherein the pass-through portion projects by about 2-4 mm beyond a rear surface of the securing disk.

12. The linear drive according to claim 10, wherein the central opening in the securing disk is of a profiled or non-round configuration.

13. The linear drive according to claim 10, wherein a clearance fit is provided between the central opening of the securing disk and an outer peripheral surface of the spindle.

14. The linear drive according to claim 10, wherein the securing disk forms a part of an inner race of the rear bearing.

* * * * *